United States Patent [19]

Nolan et al.

[11] Patent Number: 5,295,210
[45] Date of Patent: Mar. 15, 1994

[54] OPTICAL WAVEGUIDE FIBER ACHROMATIC COUPLER

[75] Inventors: Daniel A. Nolan; David L. Weidman, both of Corning, N.Y.

[73] Assignee: Corning Incorporated, Corning, N.Y.

[21] Appl. No.: 999,296

[22] Filed: Dec. 31, 1992

[51] Int. Cl.$^5$ .............................. G02B 6/26
[52] U.S. Cl. .......................... 385/43; 65/4.2; 65/4.3; 385/51
[58] Field of Search ............... 385/43, 50, 51; 65/3.11–3.15, 4.2, 4.3

[56] References Cited

U.S. PATENT DOCUMENTS

| | | | |
|---|---|---|---|
| 4,763,976 | 8/1988 | Nolan et al. | 385/43 |
| 4,773,924 | 9/1988 | Berkey | 65/3.11 |
| 5,011,251 | 4/1991 | Miller et al. | 385/43 |
| 5,044,716 | 9/1991 | Berkey | 385/43 X |
| 5,175,782 | 12/1992 | Bowen et al. | 385/43 X |
| 5,203,898 | 4/1993 | Carpenter et al. | 65/3.12 |

OTHER PUBLICATIONS

Y. Chen, A. W. Snyder, and D. J. Mitchell, Electronics Letters, vol. 26, pp. 76–77 (1990), Jan. 1990.

A. M. Vengsarkar, M. F. Gunther, K. A. Murphy, and R. O. Claus, Optical Fiber Communications Conference, 1991 Technical Digest Series, vol. 4, No. 14 (Optical Society of America, Washington, D.C., 1991), Feb. 1991, Paper TUE2.

*Primary Examiner*—John D. Lee
*Attorney, Agent, or Firm*—W. J. Simmons, Jr.

[57] ABSTRACT

An achromatic fiber optic coupler of the type wherein three single-mode optical fibers are fused together along a portion of the lengths thereof to form a coupling region. Each fiber includes a core and a cladding, the lowest refractive index of the fiber claddings being $n_2$. The fibers are disposed in a triangular array in the coupling region. A matrix glass body of refractive index $n_3$ surrounds the coupling region, $n_3$ being lower than $n_2$ by such an amount that the value of $\Delta_{2-3}$ is less than 0.125%, wherein $\Delta_{2-3}$ equals $(n_2^{2'} - n_3^2)/2n_2^2$.

17 Claims, 3 Drawing Sheets

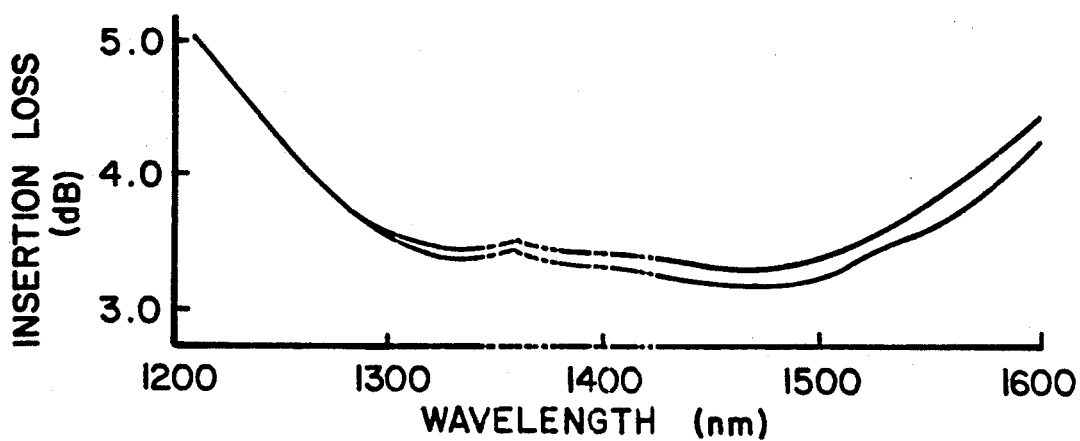
Fig. 10
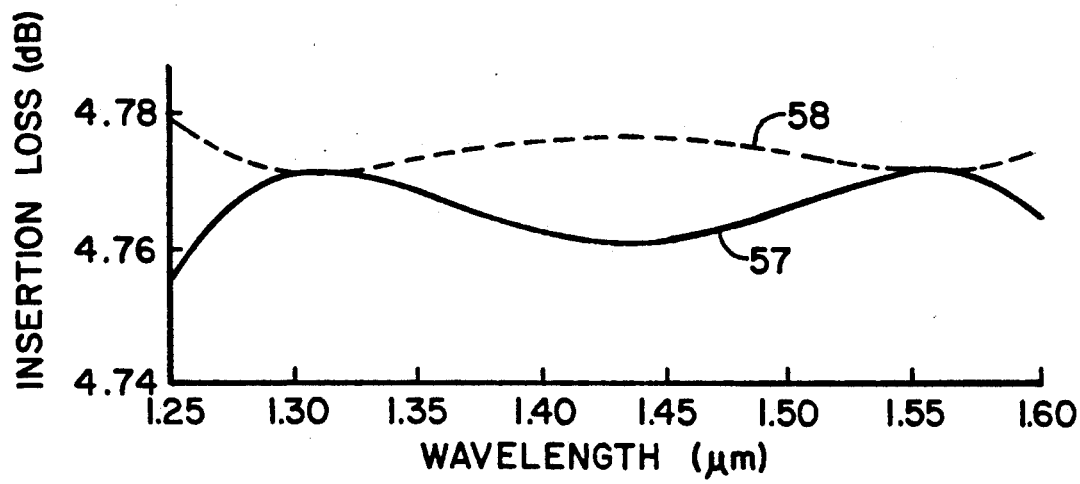
Fig. 11
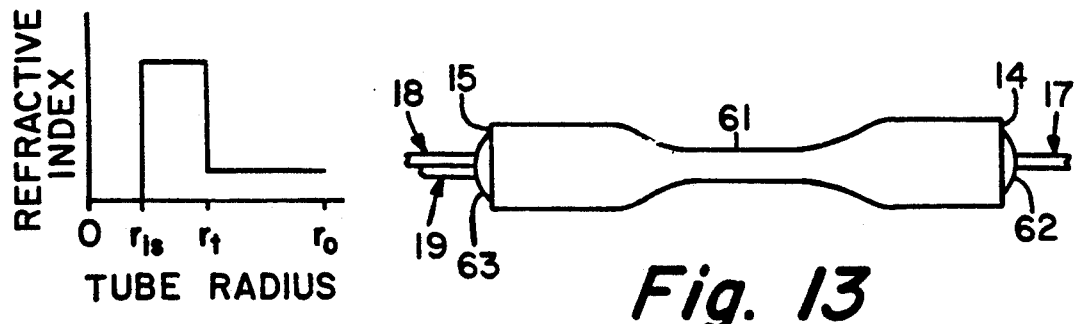
Fig. 12
Fig. 13

OPTICAL WAVEGUIDE FIBER ACHROMATIC COUPLER

BACKGROUND OF THE INVENTION

This invention relates to single-mode fiber optic couplers that are capable of effecting a relatively uniform coupling of light between fibers over a relatively broad band of wavelengths.

Fused fiber couplers have been formed by positioning a plurality of fibers in a side-by-side relationship along a suitable length thereof and fusing the claddings together to secure the fibers and reduce the spacings between the cores. Various coupler properties can be improved by inserting the fibers into a capillary tube prior to heating and stretching the fibers, thereby resulting in the formation of an "overclad coupler". To form an overclad coupler, the fibers are inserted into a tube, the tube is evacuated, and its midregion is heated and collapsed onto the fibers. The central portion of the midregion is thereafter drawn down to that diameter and coupling length which is necessary to obtain the desired coupling.

The cores become so small in the coupling region that their effect on propagation becomes very small. When the fiber cladding diameter becomes sufficiently small, the composite of the core and cladding functions as the light guiding portion of the waveguide in the coupling region, and the surrounding low index matrix material functions as the cladding. Power therefore transfers between the adjacent fiber claddings in the coupling region. The fundamental mode of that portion of the fiber that is in the coupling region (the core/clad/overclad waveguide) has a propagation constant different from the fundamental mode propagating in the fiber outside the coupling region. The term $\beta_{CR}$ will be used herein to refer to the propagation constant of the fundamental mode propagating in that portion of a coupler fiber that is in the coupling region. The propagation constant of the fundamental mode in the coupling region actually changes continuously with geometry. It is useful in order to obtain a qualitative understanding of the behavior of these couplers to consider a coupler having constant geometry in the coupling region with a lossless connection to input and output fibers.

Identical optical fibers were heretofore used to make a standard coupler, the coupling ratio of which is very wavelength dependent, i.e. if it exhibits 3 dB coupling at 1310 nm it cannot function as a 3 dB coupler at 1550 nm because of that wavelength dependence. A "standard coupler" might be characterized in terms of its power transfer characteristics in a window centered about 1310 nm, which is referred to as the first window. For example, a standard coupler might exhibit a coupling ratio that does not vary more than about ±5% within a 60 nm window.

An "achromatic coupler" is one wherein the coupling ratio is less sensitive to wavelength than it is for a standard coupler. There is no widely accepted definition of an "achromatic coupler". The least stringent definition would merely require an achromatic coupler to exhibit better power transfer characteristics than the standard coupler in the first window. More realistically, the specification is tightened by requiring an achromatic coupler to perform much better than the standard coupler in that first window, or to require it to exhibit low power transfer slopes in two windows of specified widths. These windows might be specified, for example, as being 100 nm wide and centered around about 1310 nm and 1530 nm. These windows need not have the same width; their widths could be 80 nm and 60 nm, for example. An optimally performing achromatic coupler would be capable of exhibiting low values of coupled power slope over essentially the entire single-mode operating region. For silica-based optical fibers this operating region might be specified as being between 1260 nm and 1580 nm, for example.

One type of achromatic coupler has been formed by employing fibers having different propagation constants for the fundamental mode in the coupling region, i.e. by using fibers of different diameter and/or fibers of different refractive index profile or by tapering or etching one of two identical fibers more than the other.

U.S. Pat. No. 5,011,251 teaches overclad achromatic fiber optic couplers wherein the coupled fibers are surrounded by matrix glass having a refractive index $n_3$ that is lower than that of the fiber cladding material. The $\beta_{CR}$ of the two waveguides are different in the coupling region since the fibers have different cladding refractive indices. The difference between the refractive index $n_2$ of the cladding of the first fiber and the refractive index $n_2'$ of the cladding of the second fiber is such that the coupler exhibits very little change in coupling ratio with wavelength over a relatively wide band of wavelengths. FIG. 1 shows the spectrum of a typical $\Delta\beta$ achromatic coupler, made in accordance with U.S. Pat. No. 5,011,251. Whereas the insertion loss curves of the two outputs intersect near the centers of the two telecommunications windows, they diverge near the edges of those windows, and the separation between those curves at the edges of the windows is typically about 1 dB. This separation is referred to as "uniformity", and one key standards body, Bellcore, calls out in its document referred to as TA1209 a required uniformity of 1.0 dB and an objective of 0.5 dB.

U.S. Pat. No. 5,011,251 characterizes the tube refractive index $n_3$ by the symbol $\Delta_{2\text{-}3}$, the value of which is obtained from the equation, $\Delta_{2\text{-}3} = (n_2^2 - n_3^2)/n_2^{2'}$. The term $\Delta$ is often expressed in percent, i.e. one hundred times $\Delta$. Commercially available single-mode optical fibers usually have a value of $n_2$ that is equal to or near that of silica. If silica is employed as the base glass for the tube, a dopant such as $B_2O_3$, and optionally fluorine, is added thereto for the purpose of decreasing the tube refractive index $n_3$ to a value lower than $n_2$. In addition to lowering the refractive index of the tube, $B_2O_3$ also advantageously lowers the softening point temperature thereof to a value lower than that of the fibers. That patent teaches that when $\Delta_{2\text{-}3}$ is below about 0.2%, the amount of $B_2O_3$ in a silica tube is insufficient to soften the tube glass in a 1×2 or a 2×2 coupler, whereby it excessively deforms the fibers during the collapse step. The value of $\Delta_{2\text{-}3}$ for standard couplers has therefore usually been between 0.26% and 0.35%, and to improve the reproducibility of the process of making achromatic overclad couplers of the type disclosed in that patent, $\Delta_{2\text{-}3}$ is preferably greater than 0.4%.

U.S. patent application Ser. No. 07/913,390 (D. L. Weidman-6) filed Jul. 15, 1992 teaches an overclad achromatic fiber optic coupler of the type wherein a plurality of single-mode optical fibers are fused together along a portion of their lengths to form a coupling region that is surrounded by a matrix glass body of refractive index $n_3$. The coupler taper and $n_3$ are such that the coupling constants of the coupler at two widely separated wavelengths are identical, thus giving achromatic performance. To achieve such achromatic performance, $n_3$ must be lower than $n_2$ by such an amount that the value of $\Delta_{2-3}$ is less than 0.125%, $n_2$ being the fiber cladding refractive index. The value of $\Delta_{2-3}$ is preferably chosen so that nonadiabatic taper excess loss is kept below 0.5 dB. A discussion of nonadiabatic taper devices appears in the publication, W. J. Stewart et al., "Design Limitation on Tapers and Couplers in Single-Mode Fibers", Proc. IOPOC, 1985, pages 559-562. In order to meet this requirement, it appears that $\Delta_{2-3}$ must be lower than 0.125% and preferably lower than about 0.02%. As $\Delta_{2-3}$ becomes smaller, less refractive index-decreasing dopant is present in the silica-based matrix glass tube. The relatively hard matrix glass tube therefore deforms the fibers therein during the tube collapse step of the coupler forming process. Such fiber deformation may increase coupler excess loss, offsetting that decrease in the excess loss that is due to the decreasing of the taper steepness.

SUMMARY OF THE INVENTION

It is an object of the invention to provide a method of making a single-mode overclad achromatic fiber optic coupler without excessively distorting the optical fibers in the coupling region. Another object is to provide a single-mode overclad achromatic fiber optic coupler that is characterized by a very small change in coupled power over a wide band of wavelengths. A further object is to provide a 1×2 overclad achromatic coupler having improved insertion loss uniformity.

Briefly, the present invention relates to a 1×N achromatic coupler, wherein N is 2 or 3. The coupler comprises an elongated body of matrix glass, and three optical waveguide paths extending through the body. Each path comprises a core region surrounded by a cladding region of refractive index less than that of the core region, the lowest refractive index of the cladding regions being $n_2$. The optical waveguide paths extend in sufficiently close proximity for a sufficiently long distance to form a coupling region where a portion of the optical power propagating in one of the paths couples to the other. The core regions are disposed in a triangular array in the coupling region when viewed in a plane perpendicular to the longitudinal axis of the body. The refractive index of at least that region of the body adjacent the paths is $n_3$, where $n_3$ is lower than $n_2$ by such an amount that the value of $\Delta_{2-3}$ is less than 0.125%, wherein $\Delta_{2-3}$ equals $(n_2^2 - n_3^2)/2n_2^2$.

The coupler can be made by providing a glass tube having first and second opposite ends and a midregion. At least the inner portion of the tube adjacent the bore has a refractive index $n_3$. A portion of an input glass optical fiber and the end portions of two output glass optical fibers are placed into the bore. A portion of the first fiber extends beyond the first end of the tube, and a portion of each of the two fibers extends beyond the second end of the tube. The tube midregion is collapsed onto the fibers, and the central portion of the midregion is drawn to reduce its the diameter and form a coupling region. Those portions of the input fiber and the two output fibers that are in the coupling region are disposed in a triangular array when viewed in a plane perpendicular to the longitudinal axis of the tube.

BRIEF DESCRIPTION OF THE DRAWINGS

FIG. 10 is a graph illustrating spectral coupling ratio curves for an achromatic 1×2 coupler produced by the method of Example 1.

FIG. 11 is a theoretical graph illustrating spectral coupling ratio curves for an achromatic 1×3 coupler.

FIG. 12 is a graph of refractive index plotted as a function of tube radius for one type of tube.

FIG. 13 shows a fiber optic coupler after it has been drawn down and sealed at its ends.

DETAILED DESCRIPTION OF THE INVENTION

Figure 1:
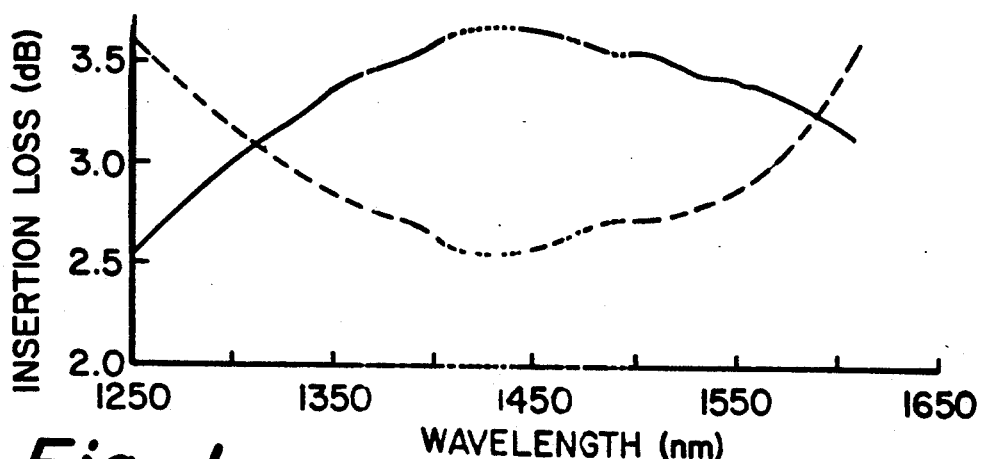
FIG. 1 is a graph illustrating spectral coupling ratio curves for an achromatic 1×2 coupler produced by a prior art method.

The drawings are not intended to indicate scale or relative proportions of the elements shown therein.

The present invention is a specific embodiment of a class of overclad fiber optic couplers that exhibit achromaticity caused by their relatively low value of $\Delta_{2-3}$. The theory of operation of such couplers will be discussed in connection with the 2×2 coupler illustrated in FIG. 2. To make the coupler of FIG. 2, optical fibers $F_1$ and $F_2$ are threaded through glass overclad tube O having a diameter $d_1$. The refractive index of at least the inner portion of the tube adjacent the fibers is $n_3$. Fibers $F_1$ and $F_2$ have a core of refractive index $n_1$ surrounded by cladding of refractive index lower than $n_1$ but greater than $n_3$. Tube O is evacuated, and its midregion is heated to collapse it onto the fibers. The tube is reheated, and its ends are pulled in opposite directions to stretch the central portion of the collapsed midregion. The tube collapse and stretching operations can be performed in accordance with U.S. Pat. No. 5,011,251, the teachings of which are incorporated herein by reference. The rate at which the two tube ends move away from each other during the stretch step constitutes the combined stretch rate. The tube can be stretched at a constant rate, or the stretch rate can vary continuously or in discrete steps. The stretching operation can stop after a predetermined coupling is achieved; thereafter, the tube can be reheated, and stretching can occur at a second stretch rate. The ratio of the original diameter $d_1$ to the diameter $d_2$ of the central portion of neckdown region N is referred to as the draw ratio R. Region N is illustrated as having a constant diameter even though a slight taper exists therein, whereby the longitudinal center of section N exhibits the minimum diameter. The coupling characteristics of the resultant coupler are determined by such parameters as the optical and mechanical characteristics of the tube O and fibers $F_1$ and $F_2$ and of the coupler parameters such as length z, neckdown region N, and tapered regions T.

Optical power can be coupled to an input optical fiber, and the output signals can be monitored to control process steps in the coupler manufacturing process. See, for example, U.S. Pat. No. 5,011,251. In the specific example described below, output power was not monitored during stretching. In previous experience with overclad fiber optic couplers, the total stretching distance for both stages was usually between 12 and 16 mm. The couplers described in that example were therefore initially elongated by some distance within that range. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

Figure 2:
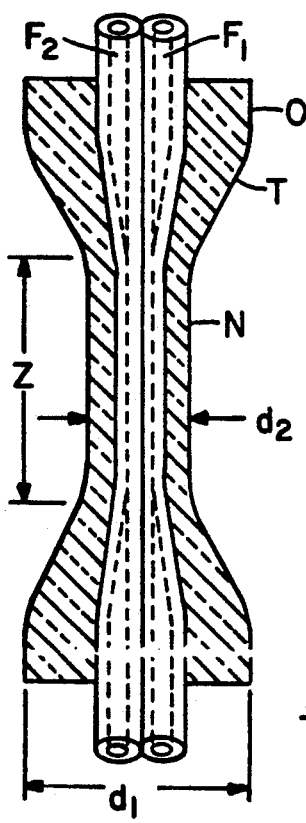
FIG. 2 is a longitudinal cross-sectional view of an overclad 2×2 coupler.

A theoretical analysis was made of 1×2 or 2×2 2-fiber achromatic 3 dB couplers using coupled mode theory to model their behavior. The analysis was based on the principles taught in the publication, A. W. Snyder and J. D. Love, *Optical Waveguide Theory*, Chapman and Hall, New York, 1983. In accordance with this theory, the mode field of the 2×2 overclad coupler of FIG. 2 is assumed to be a linear combination of the fundamental modes $\psi_1$ and $\psi_2$ of each of the fibers $F_1$ and $F_2$ in the absence of the other fiber, i.e. with the fiber surrounded by only overclad index material $n_3$. The propagation constants and mode fields can be determined exactly for such a structure (see M. J. Adams, *An Introduction to Optical Waveguides*).

The coupling constant which describes the optical coupling between the two cores can then be written as an overlap integral:

$$C = \int \psi_1(r)\psi_2(r')(n-n')dA \qquad (2)$$

In this equation, $\psi_1$ and $\psi_2$ are the mode fields of the two cores, r and r' are the radial distances from the center of the cores of fibers $F_1$ and $F_2$, respectively, n is the index structure of the entire coupler, n' is the index structure with the core and cladding of $F_1$ replaced by overcladding material of index $n_3$, and the integral is over the entire cross-section of the coupler (but n−n' is only non-zero over the core and cladding of fiber $F_1$). The mode fields are assumed to be normalized in this equation, i.e. the integrals $\int \psi_1^2 dA$ and $\int \psi_2^2 dA$ both equal 1.

While these are tapered devices, their qualitative behavior is adequately modeled by assuming a constant draw ratio over a given coupling length, with no coupling outside this length, i.e. assuming that the diameter of region N of FIG. 2 is constant over the entire length z. This approximation works well since the coupling constant is a rapidly increasing function of draw ratio, and thus the behavior of a coupler is dominated by the behavior at the highest draw ratio. Using this approximation, with the power launched into core 1, then, as a function of z, the length along the coupler axis, the power in the two cores is given by $$P_1(z) = 1 - F^2 \sin^2(Cz/F) \qquad (3)$$

and $$P_2(z) = F^2 \sin^2\left(\frac{C}{F}z\right) \qquad (4)$$

where the factor F is given by $$F = \left[1 + \left(\frac{\beta_1 - \beta_2}{2C}\right)^2\right]^{-1} \qquad (5)$$

where $\beta_1$ and $\beta_2$ are the propagation constants of fibers $F_1$ and $F_2$, respectively.

For a three-waveguide coupler as in the present invention, with unit power launched into waveguide 1 and coupled to waveguides 2 and 3, and in which waveguides 2 and 3 are identical to one another ($\beta_3 = \beta_2$) but may differ from waveguide 1, as a function of length z, the power remaining in core 1 is given by $$P_1(z) = 1 - F^2 \sin^2\left(\frac{Cz}{F}\right) \qquad (6)$$

where $$F = \left[1 + \left(\frac{\beta_1 - \beta_2 - C_{23}}{8C_{12}}\right)^2\right]^{-1}. \qquad (7)$$

Here the coupling coefficients between waveguides 1 and 2, $C_{12}$, and between waveguides 2 and 3, $C_{23}$, are given by an expression similar to equation 2, but with indices and modes appropriate to which ever pair is being considered [$\psi_1$ and $\psi_2$ for $C_{12}$, $\psi_2$ and $\psi_3$ for $C_{23}$]. By symmetry, $C_{13} = C_{12}$. The power coupled to the other waveguides is given by It can be seen that, in order to have complete coupling $$P_2(z) = P_3(z) = \tfrac{1}{2}[1 - P_1(z)]. \qquad (8)$$

from the input waveguide to $P_2$ and $P_3$ ($P_1 \rightarrow 0$), it is necessary that F=1, which requires $\beta_1 - \beta_2 = C_{23}$. In other words, for complete coupling, the input fiber must have a propagation constant which is slightly larger than that of the two output fibers.

Results can be made more quantitative by integrating the coupling equations along the taper. Still more accurate simulations may be done using beam propagation techniques (Fourier transform, finite difference, etc.), although at the cost of much increased computational time.

Figure 4:
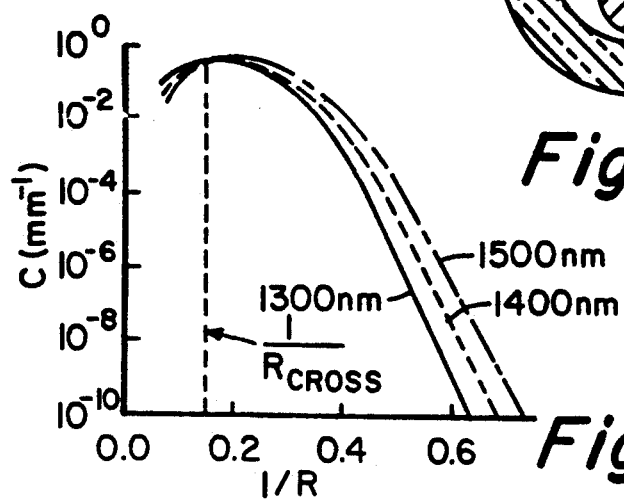
FIG. 4 is a graph of coupling constant v. inverse draw ratio at three different wavelengths for a 2×2 switch coupler having a $\Delta_{2-3}$ value of 0.35%.

The coupled mode model was used to determine the coupling constant for a 2×2 coupler as a function of draw ratio for three different wavelengths in a coupler with a $\Delta_{2-3}$ value of 0.35%. Most of the assumptions which were made concerning coupler parameters are based on work done on standard overclad couplers. Fibers $F_1$ and $F_2$ were assumed to be standard 125 $\mu$m outside diameter single-mode fibers having a core radius of 4 $\mu$m. The core and cladding refractive indices $n_1$ and $n_2$ were assumed to be 1.461000 and 1.455438, respectively. The model was used to generate the graph of FIG. 4, which illustrates the physical mechanism responsible for the improvement in achromaticity of the couplers of the present invention. In FIG. 4, the coupling constant is plotted as a function of inverse draw ratio for a parallel core 2×2 coupler. It can be seen that the coupling constant at a given wavelength increases very rapidly with increased draw ratio. However, at very large draw ratios there is a maximum in the curves. This is caused by the fact that eventually the mode field expansion becomes so large that the overlap between the mode fields of the two fibers, in the region consisting of the core and cladding of one of the fibers (which is where the coupling constant overlap integral is taken), actually decreases because of decreasing mode field amplitude. At draw ratios significantly smaller than that at the maximum, the coupling constant at the longer wavelengths is larger because its expansion is larger due to diffractive effects. However, this fact implies that the maximum coupling at the longer wavelengths occurs at a smaller draw ratio since the draw ratio at which maximum coupling occurs is determined by the point at which further mode field expansion decreases the amount which the mode field from one core overlaps that from the other core. Since the mode field expansion is greater at longer wavelengths for a given draw ratio, the maximum occurs at smaller values of R for longer wavelengths. As illustrated in FIG. 4, this causes the coupling constant curves to intersect.

In a nontapered parallel core device having a single draw ratio (see FIG. 2), in order to obtain achromatic performance (e.g. equal coupling at about 1300 and 1500 nm), the coupler geometry would be chosen so as to operate at the crossover point of the coupling constant curves, $R_{CROSS}$ for the two wavelengths as illustrated in FIG. 4. In a tapered device, which has a geometry which includes all draw ratios up to a maximum, $R_{MAX}$, it is necessary to have $R_{MAX} > R_{CROSS}$ (to have $1/R_{MAX}$ to the left of the crossover point in FIG. 4). This is because at low draw ratios near the ends of the taper (see region LW between dashed lines 5 and 6 of FIG. 5), the coupling is stronger at longer wavelengths, and so long wavelength light couples more. By tapering such that $R_{MAX} > R_{CROSS}$, the coupler also includes a region SW (between dashed lines 4 and 5) where the coupling is stronger at shorter wavelengths, thereby compensating for the small draw ratio region. Regions SW and LW pertain to the taper of tube 3b of FIG. 5. The exact value of $R_{MAX}$ must be determined by numerical integration of the coupling equations over the tapered device.

Figure 5:
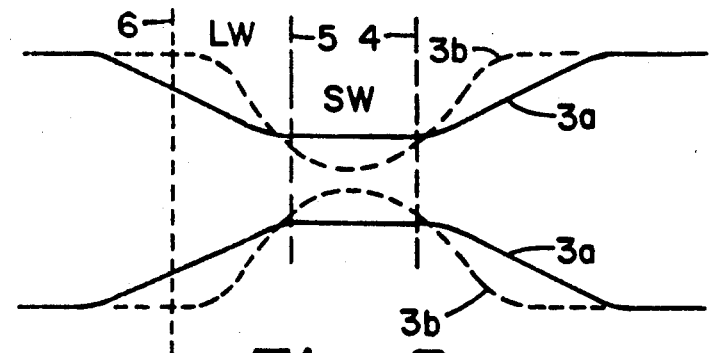
FIG. 5 is a schematic illustration of the outer surfaces of two tubes having different draw ratios and different coupling distances but similar coupling.

From FIG. 4 and the previous discussion related thereto, it can be seen that a draw ratio of about 10:1 would be needed to form an achromatic coupler wherein $\Delta_{2-3}$ is 0.35%. Such a high draw ratio can result in a relatively high excess loss for the following reason. Higher draw ratios cause an increase in coupling strength, thereby necessitating a shorter coupling distance z. This relationship is illustrated in FIG. 5 wherein the outer surfaces of two stretched tubes 3a and 3b are illustrated by solid and dashed lines, respectively. Since tube 3b has a larger draw ratio than tube 3a, tube 3b must have a shorter coupling distance z than tube 3a to achieve the same coupling (on the first cycle of the power transfer curve). The power transfer curve is discussed in U.S. Pat. No. 5,011,251 in connection with FIG. 6 of that patent.

It is known that undesirable mode coupling from the fundamental $LP_{01}$ mode to higher modes becomes stronger for the steeper tapers of the high draw ratio/short coupling region of tube 3b. This nonadiabatic coupling can increase the coupler excess loss.

The aforementioned model was used to calculate the theoretically required taper parameters for 1×2 double window switches. A description of the draw ratio of a tapered coupler as a function of distance z along its length (origin of z at the maximum draw ratio point) can be simply given as a gaussian function involving the maximum draw ratio, $R_{MAX}$, and the gaussian width parameter, $\omega_0$. It is given by $$R(z) = 1 + (R_{MAX} - 1) \exp[-(z/\omega_0)^2] \qquad (9)$$

Typical values of these parameters for a standard 2×2 WDM coupler are $R_{MAX}$ from 3 to 6 and $\omega_0$ from 3000 to 6000 μm. The model revealed that values of the parameters $R_{MAX}$ and $\omega_0$ are in the range of current coupler values for very small values of $\Delta_{2-3}$. By "current coupler" is meant overclad couplers of the type disclosed in U.S. Pat. No. 5,011,251, wherein $\Delta_{2-3}$ is greater than 0.26%. The lower values of $\Delta_{2-3}$ will displace the curves of FIG. 4 to the right (toward lower values of draw ratio) and down (toward smaller values of maximum coupling constant), whereby achromatic couplers having easily achievable draw ratios can be formed. As the value of $\Delta_{2-3}$ is made smaller, the required value of $R_{MAX}$ becomes smaller, and the needed coupling length (indicated by the gaussian width parameter, $\omega_0$) becomes longer. Thus the taper becomes less steep.

A theoretical maximum to the $\Delta_{2-3}$ value which can be used may be obtained by considering limitations due to nonadiabatic mode coupling. The propagation constants ($\beta$) were calculated for the $LP_{01}$ and $LP_{02}$ modes. The $LP_{02}$ mode is the lowest order mode that couples to the $LP_{01}$ mode in an ideal, matched fiber coupler. From equation (6) and the $\beta$s of the $LP_{01}$ and $LP_{02}$ modes, the parameters $1/a|da/dz|$ and $\frac{1}{2}\pi[\beta(LP_{01}) - \beta(LP_{02})]$ were determined, where a is the core radius and z is the distance as measured along the coupler axis. For adiabatic performance, the following relationship must exist:

$$\tfrac{1}{2}\pi[\beta(LP_{01}) - \beta(LP_{02})] - 1/a|da/dz| > 0 \qquad (10)$$

Figure 6:
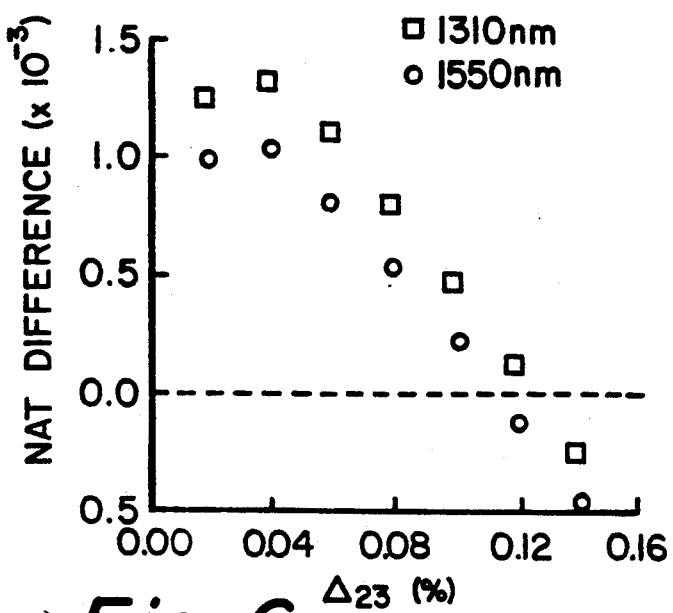
FIG. 6 is a graph wherein the "NAT Difference", the difference parameter of equation (10), is plotted as a function of $\Delta_{2-3}$ for wavelengths of 1310 nm and 1550 nm.

The difference parameter of equation (7), referred to herein as the "NAT Difference", is plotted as a function of $\Delta_{2-3}$ in FIG. 6 for wavelengths of 1310 and 1550 nm. The NAT Difference was calculated for $\Delta_{2-3}$ values from 0.02% to 0.14% at each of the two wavelengths. The 1310 nm curve experiences a NAT Difference of zero at a maximum possible theoretical $\Delta_{2-3}$ value of about 0.125%. From practical experience, it was found that significant achromaticity improvements can be obtained with $\Delta_{2-3}$ values of about 0.045% or less at wavelengths in the 1300-1550 nm range. With the tapers that could be achieved on draw equipment of the type illustrated in FIG. 9, achromatic couplers could not be formed when $\Delta_{2-3}$ was 0.09%. However, in order to form achromatic couplers at $\Delta_{2-3}$ values greater than 0.045%, tubes having smaller outside diameters could be employed, and a burner able to provide a smaller, more tightly focused flame could be used. Best results have been obtained with $\Delta_{2-3}$ values of about 0.01% to 0.02%. The lower limit of measurement capability of $\Delta_{2-3}$ is 0.01%.

Figure 3:
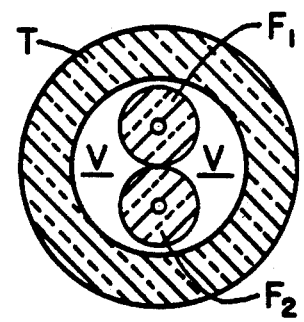
FIG. 3 is a transverse cross-sectional view through the midregion of an overclad 2×2 coupler prior to the collapse step.

The above discussion details the principles of the invention in the context of two-fiber couplers, the simplest fiber arrangement from which overclad couplers can be formed. As shown in FIG. 3, there is much vacant space V on opposite sides of fibers $F_1$ and $F_2$ prior to the step of collapsing tube T onto the fibers. It has been mentioned in the background portion hereof that low loss achromatic couplers having more easily formed tapered regions require relatively low $\Delta_{2-3}$ values. Thus, in a 2-fiber achromat, the fibers are distorted by the pressure exerted by the high viscosity tube during the tube collapse step; this distortion causes an increase in coupler excess loss.

Figure 7:
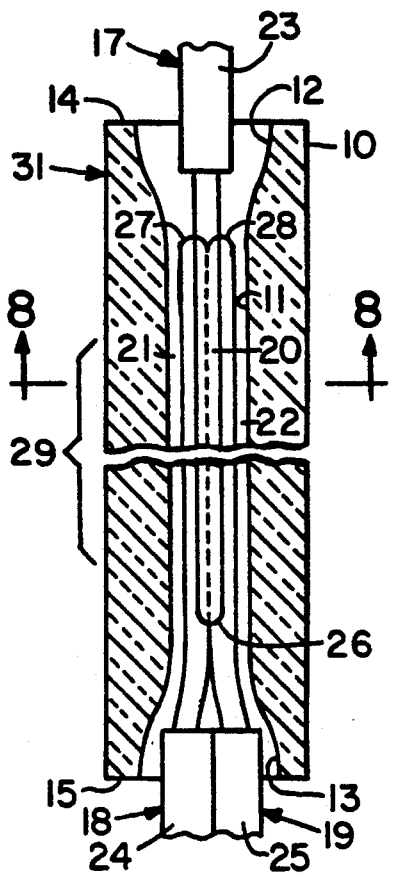
FIG. 7 is a cross-sectional view of a capillary tube after optical fibers have been inserted therein.
Figure 8:
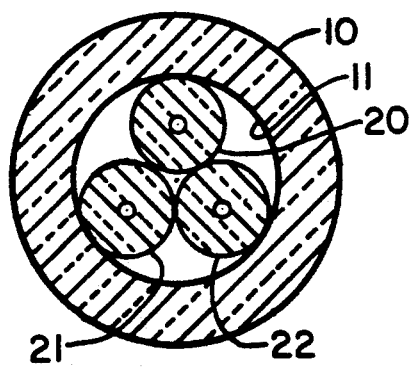
FIG. 8 is a cross-sectional view taken along lines 8—8 of FIG. 7.

The fiber deformation problem has been substantially diminished by employing the triangular fiber arrangement shown in FIGS. 7 and 8. In this embodiment, coating 23, 24 and 25 is stripped from the ends of coated fibers 17, 18 and 19, respectively, and the ends of the fibers are provided with antireflection terminations as described below. Input fiber 20 is inserted into one end of bore 11 of tube 10, and output fibers 21 and 22 are inserted into the other end. The fibers are tacked in place by a small amount of epoxy. The coupler preform is then placed in the draw chucks, tube 10 is evacuated, and its midregion is heated and collapsed onto the fibers. The central portion of the midregion is thereafter drawn down to that diameter and coupling length which is necessary to obtain the desired coupling. The fiber cores are thus disposed in a triangular array in the coupling region when viewed in a plane perpendicular to the longitudinal axis of the coupler body.

The coupler can be drawn to form a tapered region such that the power injected into the input fiber is substantially equally and completely coupled to the two output fibers, thereby generating the substantially parallel insertion loss curves shown in FIG. 10. In order to maximize power transfer from the input fiber, the input fiber core/clad/overclad waveguide must have a propagation constant $\beta_{1CR}$ in the coupling region that is slightly larger than $\beta_{2CR}$, the propagation constant of each of the two output fiber core/clad/overclad waveguides. This can be accomplished, for example, by doping the cladding of the input fiber with slightly more chlorine than the amount present in the claddings of the output fibers. This technique, which causes the refractive index of the input fiber cladding to be greater than that of the output fiber cladding, is described in U.S. Pat. No. 5,011,251.

The theory for improving achromaticity by employing small values of $\Delta_{2-3}$, which is discussed above in connection with overclad achromatic 2×2 couplers, also applies to 3-fiber 1×2 and 1×3 couplers. Thus, by employing a $\Delta_{2-3}$ value less than 0.02%, the insertion loss curves of the device of FIGS. 7 and 8 are relatively flat; they also exhibit very good output fiber insertion loss uniformity.

Since the triangular geometry of FIGS. 7 and 8 fills more of the bore 11 with glass than the 2-fiber geometry of FIG. 3, it results in less fiber distortion during the step of collapsing the tube glass around the fibers. Couplers made by the embodiment of FIGS. 7 and 8 therefore exhibit less excess loss.

Further advantages also result from this 1×2 triangular fiber arrangement. Only the ends of the fibers need to be stripped, as opposed to stripping coating from the center of the through fiber or fibers in 2-fiber embodiments such as that shown in FIG. 3. Moreover, this approach to coupler fabrication does not require that a fiber be threaded through the tube bore. These differences may make this coupler more easily manufacturable and suitable for high volume production.

This triangular fiber arrangement can also be used to fabricate achromatic 1×3 power splitters. At predetermined wavelengths, one-third of the input power can be caused to remain in the input fiber, which continues on through the coupler and functions as a third output fiber. It is noted that the coating must be stripped from the central region of this input/continuation output fiber, rather than the end thereof. In order to equalize the power in all of the fibers, including the output portion of the input fiber, the input/continuation output fiber must be provided with a propagation constant different from that of the remaining output fibers. The $\Delta\beta_{CR}$ and taper would be chosen so that the insertion loss curves of the two coupled output fibers would be as illustrated by curve 58 of FIG. 11, and the insertion loss curve for the input/continuation output fiber would be as illustrated by curve 57. Such a $\Delta\beta_{CR}$ value can be obtained by employing an input fiber having a different cladding refractive index than the remaining fibers. In such a 1×3 3-fiber coupler, about three times the chlorine disparity would be needed between the claddings of the throughput fiber and the two coupled-power output fibers as compared with that which was required for the 1×2 3-fiber coupler. A dopant other than chlorine could be employed to provide the refractive index disparity necessary to cause the required level of input power to be retained in input/throughput fiber.

There are a number of different approaches that can be taken to achieve the required very small values of $\Delta_{2-3}$. One approach involves the use of a pure $SiO_2$ tube and optical fibers having chlorine doped claddings to provide them with a refractive index greater than that of the silica tube. This technique provides good control of refractive index of both tube and fiber cladding. Polarization variability was good. The major disadvantage of this combination of glasses was that it results in very little difference in viscosity between the tube and the fibers. This causes the fibers to deform and results in relatively high excess loss.

Commercially available single-mode optical fibers usually have a value of $n_2$ that is equal to or near that of silica. When this type of fiber is employed, the tube can be formed of silica doped with a small amount of $B_2O_3$ (in the range of 0.15 wt. % to 1.0 wt. %). The $B_2O_3$ softens the tube glass relative to the fiber cladding glass, thereby resulting in the formation of couplers having low excess loss.

If the fiber cladding glass contains fluorine, a dopant that depresses refractive index, the silica tube can contain a sufficient amount of $B_2O_3$ to depress the tube refractive index to the level necessary to provide a $\Delta_{2-3}$ value less than 0.125%.

A further approach is to form the tube from a base glass doped with one or more refractive index-decreasing dopants such as $B_2O_3$ and fluorine and one or more refractive index-increasing dopants such as $GeO_2$ and $TiO_2$. The combination of the two types of dopants provides a refractive index $n_3$ that results in the desired value of $\Delta_{2-3}$. Employing tubes of relatively soft glass enhances to a certain extent the collapsing of the tube onto the fibers; the tube glass flows around the fibers without distorting their shape as much as a harder glass would. Because of the intricate balancing of dopants that is required with this embodiment, it is difficult to implement.

The overclad tube is preferably made by a vapor deposition technique sometimes referred to as the flame hydrolysis process. The tube could also be formed from melted glass or by a sol gel technique.

Tubes having radial changes in composition have also been employed to make achromatic couplers. The inner region of the tube adjacent the tube bore is formed of a composition that provides the desired value of $\Delta_{2-3}$. The remainder of the tube can be formed of one or more regions having refractive indices that differ from the inner region. In the example shown in FIG. 12, the inner region of the tube between the inner surface $r_{is}$ and transition radius $r_t$ can contain a small amount of $B_2O_3$ to provide a sufficiently low value of $\Delta_{2-3}$ to provide the coupler with achromaticity. The outer tube region between $r_t$ and the outer surface $r_o$ may contain a higher concentration of $B_2O_3$ than the inner region. The higher $B_2O_3$ concentration results in a lower refractive index region, thereby better confining the optical power. Couplers having similar excess losses have been achieved using both substantially constant radial refractive index tubes and tubes having a step decrease in refractive index with radius.

A disparity in propagation constants between input and output fibers can also be obtained by employing fibers of different diameters.

EXAMPLE 1

Figure 9:
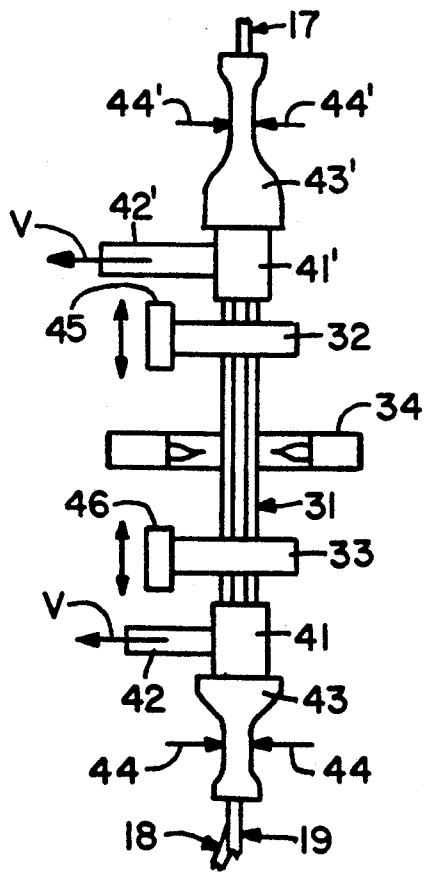
FIG. 9 is a schematic illustration of an apparatus for collapsing a capillary tube and stretching the midregion thereof.

A method of making a 1×2 double-window achromatic fiber optic coupler is illustrated in FIGS. 7–9. A glass capillary tube 10 having a 3.8 cm length, 2.8 mm outside diameter, and 265 μm longitudinal bore diameter was employed. Tube 10, which was formed by a flame hydrolysis process, was formed of silica doped with about 0.5 wt. % $B_2O_3$.

Coated fibers 17, 18 and 19 comprised 1.5 meter lengths of 125 μm diameter single-mode optical fibers 20, 21 and 22 having 250 μm diameter urethane acrylate coatings 23, 24 and 25, respectively. These fibers, which were made in accordance with the teachings of U.S. Pat. No. 5,011,251, had an 8 μm diameter core of silica doped with 8.5 wt. % $GeO_2$. The cutoff wavelengths of the fibers were below the operating wavelength of the coupler. If, for example, the minimum operating wavelength is 1260 nm, the cutoff wavelengths of the fibers are selected to be between 1200 nm and 1250 nm.

The initial steps of the processes of making all of the fibers were the same. A general description of that process is described in U.S. Pat. Nos. 5,011,251 and 4,486,212, the teachings of which are incorporated herein by reference. A coating of core glass particles was deposited on a mandrel, and a thin coating of $SiO_2$ particles was deposited on the core glass coating. The mandrel was removed, and the resultant porous preform was gradually inserted into a furnace having an alumina muffle where it was dried and consolidated while a gas mixture containing chlorine and helium flowed into the center hole where the mandrel had been removed. A flushing gas containing helium and oxygen flowed upwardly from the bottom of the muffle. After the porous preform was consolidated, the aperture was evacuated, and the lower end of the tubular body was heated and drawn to form a 5 mm solid glass rod. The rod was severed to form sections, each of which was supported in a lathe where it functioned as a mandrel upon which $SiO_2$ cladding glass particles were deposited to form a final porous preform.

Final porous optical fiber preforms are conventionally consolidated in a gas mixture containing helium, chlorine and oxygen. The amount of chlorine that is employed, which is usually that amount that is just sufficient to dry the deposited cladding glass particles, depends upon various parameters including the density of the porous cladding glass coating and the consolidation temperature. The final porous preforms of the input fiber and the output fibers were formed and consolidated under such conditions that the chlorine concentration in the input fiber cladding was 0.10 wt. %, and the chlorine concentration in the output fiber cladding was 0.05 wt. %. The refractive indices of the claddings of the input and output fibers were such that the value of $\Delta_{CLADS}$ was 0.005%, where $\Delta_{CLADS}=(n_2^2-n_{2'}^2)/n_2^2$, $n_2$ being the refractive index of the cladding of input fiber 20 and $n_{2'}$ being the refractive index of the cladding of output fibers 21 and 22.

A 6 cm long section of coating was removed from the ends of each length of coated fiber. Antireflection terminations 26, 27 and 28 were formed on the end of the fibers by directing a flame at the center of the stripped region of fiber, while the end of the fiber was pulled and severed to form a tapered end. The tip of fiber 20 was heated by a burner flame to cause the glass to recede and form a rounded endface, the diameter of which was equal to or slightly smaller than the original uncoated fiber diameter. The resultant stripped end regions were about 3.2 cm long.

The uncoated portions of the fibers were wiped. Fibers 21 and 22 were inserted through funnel 13 and into bore 11 until the end regions of coatings 24 and 25 were interior to funnel 13, and end 26 was located between midregion 27 and tube end 15. Fiber 20 was inserted through funnel 12 and into bore 11 until the end region of coating 23 was interior to funnel 12, and ends 27 and 28 were located between midregion 27 and tube end 14. A small amount of UV-curable adhesive (not shown) was applied to fibers 18 and 19 near end 15 to tack them to funnel 13 and to fiber 17 near end 14 to tack it to funnel 12. Preform 31 was then inserted through ring burner 34 (FIG. 9) and was clamped to draw chucks 32 and 33. The chucks were mounted on motor controlled stages 45 and 46. The fibers were threaded through the vacuum attachments 41 and 41', to which vacuum lines 42 and 42', respectively, were connected. Vacuum attachments 41 and 41' were sealed to the ends of tube 10 as taught in U.S. Pat. No. 5,011,251. One end of a length of thin rubber tubing 43 was attached to that end of vacuum attachment 41 opposite preform 31; the remaining end of the tubing extending within tube clamping means represented by arrows 44. Upper vacuum attachment 41' was similarly associated with tubing 43' and tube clamping means 44'. The coated portions of the fibers extended from tubing 43 and 43'. Vacuum V was applied to coupler preform 31 by directing air pressure against tubing 43 and 43' as indicated by arrows 44, 44', thereby clamping the tubing against the fibers extending therethrough.

With a vacuum of 46 cm of mercury connected to the tube bore, ring burner 34 was ignited. Flames were generated by supplying gas and oxygen to the burner at rates of 0.55 slpm and 1.10 slpm, respectively. The flame from ring burner 34 heated tube 10 for about 12 seconds, and tube midregion 27 collapsed onto the fibers.

After the tube cooled, the burner was reignited, the flow rates of both the gas and oxygen remaining the same. The flames heated the center of the collapsed region to the softening point of the materials thereof. After 10 seconds, the supply of oxygen to burner 34 was turned off. Stages 45 and 46 were pulled in opposite directions at a combined rate of 1.0 cm/sec to elongate tube 10 by 0.65 cm to form neckdown region 61 (FIG. 12), the taper of which was such that power injected into the input fiber substantially equally and completely coupled to the two output fibers.

After the coupler cooled, the vacuum lines were removed, and drops 62 and 63 of adhesive were applied to ends 14 and 15 of the tube. The adhesive was cured by exposure to UV light, and the coupler was removed from the chucks.

The spectral insertion loss curves for a coupler made in accordance with Example 1 are shown in FIG. 10. It can be seen that the insertion loss curves of the coupler of this example are relatively flat and are substantially parallel, whereby they exhibit an insertion loss uniformity of 0.24 dB. The excess loss for that device was 0.04 dB and 0.37 dB at 1310 nm and 1550 nm, respectively. Couplers made in accordance with Example 1 exhibited a median excess device loss of about 0.2 dB at 1310 nm. The lowest measured excess loss was 0.04 dB at 1310 nm.

What is claimed is:

1. A $1 \times N$ achromatic coupler, wherein N is 2 or 3, said coupler comprising
   an elongated body of matrix glass, and
   three optical waveguide paths extending through said body, each of said paths comprising a core region surrounded by a cladding region of refractive index less than that of said core region, the lowest refractive index of said cladding regions being $n_2$, a portion of said cladding regions disposed in contact with said body,
   said optical waveguide paths extending in sufficiently close proximity for a sufficiently long distance to form a coupling region where a portion of the optical power propagating in one of said paths couples to the other of said paths,
   said core regions being disposed in a triangular array in said coupling region when viewed in a plane perpendicular to the longitudinal axis of said body,
   the refractive index of at least that region of said body adjacent said paths being $n_3$, where $n_3$ is lower than $n_2$ by such an amount that the value of $\Delta_{2-3}$ is less than 0.125%, wherein $\Delta_{2-3}$ equals $(n_2^2 - n_3^2)/2n_2^2$.

2. A coupler in accordance with claim 1 wherein said waveguide paths comprise optical fibers.

3. A coupler in accordance with claim 2 wherein said matrix glass is a cylindrically-shaped body through which said fibers longitudinally extend, the diameter of a portion of said body remote from the ends thereof being smaller than the diameters of the ends of said body.

4. A fiber optic coupler comprising
   an elongated body of matrix glass, said body having first and second opposed ends and a midregion,
   an input optical fiber and two output optical fibers extending longitudinally through said midregion, each of said fibers comprising a core surrounded by a cladding of refractive index less than that of said core, the lowest refractive index of the claddings of said optical fibers being $n_2$, said optical fibers being positioned in a triangular array in said midregion, a portion of said claddings of said optical fibers disposed in contact with said body,
   the refractive index of at least that region of said body adjacent said fibers being $n_3$, where $n_3$ is lower than $n_2$ by such an amount that the value of $\Delta_{2-3}$ is less than 0.125%, wherein $\Delta_{2-3}$ equals $(n_2^2 - n_3^2)/2n_2^2$,
   the diameter of the central portion of said midregion and the diameters of said optical fibers in said central portion of said midregion being smaller than the diameters thereof at the ends of said body,
   said input optical fiber extending from said first end of said body, and
   said output optical fibers extending from said second end of said body.

5. A fiber optic coupler in accordance with claim 4 wherein the composition of said matrix glass body is substantially uniform throughout its radius.

6. A fiber optic coupler in accordance with claim 4 wherein said matrix glass body comprises an inner region adjacent said optical fibers having a refractive index $n_3$ and another region adjacent said inner region, the refractive index of said another region being less than $n_3$.

7. A fiber optic coupler in accordance with claim 4 wherein said input optical fiber extends only from said first end of said body, none of said fibers extending entirely through said body.

8. A fiber optic coupler in accordance with claim 7 wherein the cladding refractive index of said input fiber is greater than the cladding refractive index of said two output fibers.

9. A fiber optic coupler in accordance with claim 4 wherein said input optical fiber extends entirely through said body and from said first and second ends of said body.

10. A fiber optic coupler in accordance with claim 9 wherein the cladding refractive index of said input fiber is different from that of said two output fibers.

11. A method of making a $1 \times N$ fiber optic coupler, wherein N equals 2 or 3, said method comprising
    providing a glass tube having first and second opposite ends and a midregion, a longitudinal bore extending from a first end of said tube to a second end thereof, at least the inner portion of said tube adjacent said bore having a refractive index $n_3$,
    disposing within said bore a portion of an input glass optical fiber and the end portions of two output glass optical fibers, each of said fibers having a core surrounded by a cladding of refractive index less than that of said core, a portion of said cladding of each of said fibers disposed in contact with said bore, the lowest refractive index of the claddings of said optical fibers being $n_2$, wherein $n_2$ is greater than $n_3$ by such an amount that the value of $\Delta_{2-3}$ is less than 0.125%, wherein $\Delta_{2-3}$ equals $(n_2^2 - n_3^2)/2n_2^2$, a portion of said input fiber extending beyond the first end of said tube, a portion of said two output fibers extending beyond the second end of said tube,
    collapsing said tube midregion onto said fibers, and
    drawing the central portion of said midregion to reduce the diameter thereof and form a coupling region in which said input fiber and said two output fibers are disposed in a triangular array when viewed in a plane perpendicular to the longitudinal axis of said tube.

12. A method in accordance with claim 11 wherein the refractive index of said tube is substantially uniform throughout its radius.

13. A method in accordance with claim 11 wherein said tube comprises an inner region adjacent said bore having a refractive index $n_3$ and another region adjacent said inner region, the refractive index of said another region being less than $n_3$.

14. A method in accordance with claim 11 wherein said input optical fiber extends only from said first end of said tube and said two output optical fibers extend from said second end of said tube.

15. A method in accordance with claim 14 wherein the cladding refractive index of said input fiber is greater than the cladding refractive index of said two output fibers.

16. A method in accordance with claim 11 wherein said input optical fiber extends from said first and second ends of said tube and said two output optical fibers extend from said second end of said tube.

17. A method in accordance with claim 16 wherein the cladding refractive index of said input fiber is different from the cladding refractive index of said two output fibers.

* * * * *